March 23, 1971 D. N. OBENSHAIN 3,572,147
DUAL DIRECT TIMING BELT FEED ROLL DRIVE
Filed July 11, 1969 3 Sheets-Sheet 1

INVENTOR
David Noel Obenshain

BY Larry C. Hall
ATTORNEY

INVENTOR
David Noel Obenshain
BY Larry C. Hall
ATTORNEY

# United States Patent Office 3,572,147
Patented Mar. 23, 1971

3,572,147
DUAL DIRECT TIMING BELT FEED ROLL DRIVE
David Noel Obenshain, Luke, Md., assignor to
Westvaco Corporation, New York, N.Y.
Filed July 11, 1969, Ser. No. 840,909
Int. Cl. F16h 9/24
U.S. Cl. 74—219
11 Claims

ABSTRACT OF THE DISCLOSURE

A variable ratio drive mechanism is presented which employs three exchangeable timing gears and a fixed timing gear driven by two fixed length timing belts. A pressure actuated pulley assembly is provided on the drive end of each timing gear to enable the exchangeable timing gears to be readily removed in order to change the drive ratio, and, an adjustable parallel arms mounting means is provided for one of the exchangeable timing gears drives to adjust the tension in the timing belts when different timing gears are installed.

BRIEF DESCRIPTION OF INVENTION

This invention relates generally to a drive mechanism and more particularly to an adjustable ratio drive mechanism which is capable of providing a very wide range of ratios in small positive increments, and which is substantially free from backlash, has a high degree of torsional stiffness, and whose ratio can be easily and quickly changed. The drive mechanism contemplated by the invention utilizes a plurality of exchangeable timing gears which are driven by timing belts and including quick change mounting means for the timing gears, all cooperating to give an adjustable ratio drive of high power, high speed and with a degree of precision not formerly known. Accordingly, the driving ratio is changed by choosing timing gears with a particular number of teeth in association with other timing gears having a known number of teeth.

More particularly, the invention relates to a feeding and cutting drive mechanism wherein the mechanical elements thereof may be readily changed to adjust the feeding and cutting rate. Specifically, the invention pertains to a novel mechanism for use in paper cutting machinery, but it could find use in other applications requiring an extremely precise, easily adjustable ratio drive capable of transmitting appreciable power.

In a paper cutting machine it is desirable and important that the length of the web fed in a cutter cycle be precisely predetermined and positively controlled. If this criteria is observed, the need for subsequent edge trimming before shipment to the user is eliminated. Moreover, the machine should be arranged and driven so that it might be quickly and conveniently set to feed consistently any one of a multiplicity of predetermined sheet lengths per cutter cycle. The different sheet lengths desirable differ only slightly from one another and form collectively an unbroken arithmetical series between widely spaced lower and upper limits.

A conventional sheet cutter comprises a rotary drum having mounted in its periphery one or more flyknives; a stationary bedknife cooperating with the flyknives; and, a set of feed rolls feeding the paper to the cutting zone. A ratio drive between the rotary cutter drum and the feed rolls determines the sheet length being cut.

In some sheet cutters, a spur gear on the cutter drum shaft cooperates with another spur gear on the feed shaft, the ratio of the two gears and the diameter of the feed roll determining the sheet length obtained. Due to inherent backlash and inaccuracies in normal change-type spur gearing, paper thus cut varies so much in length that it usually has to be cut oversize and subsequently gillotine trimmed to exact size. Very precise gearing enclosed in an oil-tight gear case can be used for very precise sheeting, but of course cannot be readily changed for different sheet lengths.

Many devices have been tried, to give a wide range of sheet sizes together with precise sheet dimensions, including expandable flat belt pulleys, P.I.V. drives and combination differentials and P.I.V. drives, or Positive power transmission drives having Infinite speed Variation. With the gear box of applicant's prior U.S. Patent No. 3,128,662, the average sheet length obtained was near perfect, but the variation from longest to shortest sheet was not always acceptable. This was finally traced to the presence of torsional vibration. The torsional vibration was accounted for by the torsional stretch of the vartious gears, shafts and supporting structures in the gear box, and in the connections between the gear box and the cutter drum and feed rolls.

Hence, to overcome these deficiencies and satisfy the sheet length requirements, the novel arrangement hereinafter set forth in detail was constructed.

For the sake of accuracy in driving components, toothed driving wheels, or timing gears and specially manufactured timing belts were chosen. The arrangement used grooved timing gears somewhat similar to spur gears, and matching toothed belts to engage the timing gear grooves. There was accordingly no slip and the ratios were exact, as determined by the number of grooves or teeth in the timing gears used in the drive. The teeth in the belts fit very snugly in the grooves in the timing gears thereby substantially eliminating backlash. The belts have steel cables in their backs and therefore stretch only very slightly under load. It was found that conventional V-belts and/or other driving means yielded erratic and uncontrollable sheet length because of slippage and uncompensatable expansion/contraction characteristics. Hence the choice of reinforced timing belts for the machine drive offered a means for assuring carefully controlled feeding to the cutter during the cutting cycle. This direct drive did give the sheet length precision required—not more than ±0.04%—but the timing gears were very difficult and time-consuming to change. Furthermore, the incremental steps were too great, and no combination of timing gears could be obtained to give all the sheet lengths required. Accordingly, the problem subsequently faced required a means for obtaining the variable sheet length requirements using the timing belts as a drive means. It was found that by using a great length timing belt, different feeding rates could be achieved by employing timing gears with different numbers of teeth. This arrangement allowed the operator to set the machinery up for a given sheet length setting, but the secondary requirement for quick and convenient sheet length changes became important.

With the new timing belts and timing gears of varying diameters, it was found that a greater range of stock sheet lengths could be cut, and, cut with improved accuracy. All that was required was a convenient means for exchanging the exchangeable timing gears whenever a new sheet length setting was desired. It was found that the exchangeable timing gears could be taken on and off the drive shafts by hand but this was deemed too time consuming for the use intended. Accordingly, the pressure actuated pulley assemblies described and claimed hereinafter were developed.

With the pressure actuated pulley changing mechanism it became possible to rapidly change from one timing gear to another whenever a different sheet length setting was desired. This system also insured that the timing gear would be mounted on its shaft so as to run true without wobble or slip. The complete system of timing belts, timing gears and pneumatic pulley changing mechanism allowed the machine to operate without the complicated gearbox by simply running an additional timing belt directly from the driving motor, and from there to the feed roll and the cutting drum.

Hence an important object of this invention was to eliminate the conventional gear change unit previously employed on paper cutting machinery for controlling the web length setting.

Another secondary object of this invention was to provide a means for quickly, conveniently and accurately changing the timing gear pulley drives for altering the sheet lentgh setting.

Another general object of this invention was to provide a compact and simple arrangement of parts which could be utilized to force a machinery part onto or off of a shaft.

An additional object was to provide a device of the type desired which could be adapted further to hold the mchinery part permanently in final position on the shaft.

A further object of this invention was to provide a sheet length drive mechanism to replace the gear change unit disclosed and claimed in applicant's prior U.S. Pat. No. 3,128,662.

Other objects and advantages will hereinafter appear.

DETAILED DESCRIPTION

In conventional sheeting operations at a paper mill, a single web, or, webs from a plurality of rolls, are combined and directed through a sheet cutting machine at relatively low speed. The sheets thus cut are then edge trimmed, sorted and packaged for shipment to the user.

In applicant's patented sheet inspecting and sorting mechanism disclosed initially in U.S. Pat. No. 3,203,326, a machine for feeding, cutting, inspecting, sorting and stacking sheets of paper was claimed. For that apparatus a gear change unit as disclosed in applicant's U.S. Pat. No. 3,128,662 was employed to selectively change the length of the sheet to be cut so that no subsequent edge trimming was necessary.

The length of sheet cut depended on the length of web fed during a cutting cycle of a conventional flying cutter. A common driver was provided for the cutter drum and for the web feeding means. The cutter drum was positively driven from the common driver in fixed relation thereto, while a manually settable speed change transmission unit was interposed between the common driver and the web feeding means, for causing any one of a variety of selected lengths to be fed and cut.

The system outlined above proved somewhat satisfactory but had certain restrictive characteristics as set forth hereinbefore and including a limited number of sheet lengths available and a rather cumbersome and expensive mechanical drive.

The drive means employed in the present invention still uses a common driver for the cutter drum and the web feeding means, but the expensive mechanical drive has been eliminated. The length of sheet cut still depends on the length of web fed during a cutting cycle of a conventional flying cutter, but the means for determining how much web is fed during a cycle has been changed.

Figure 1:
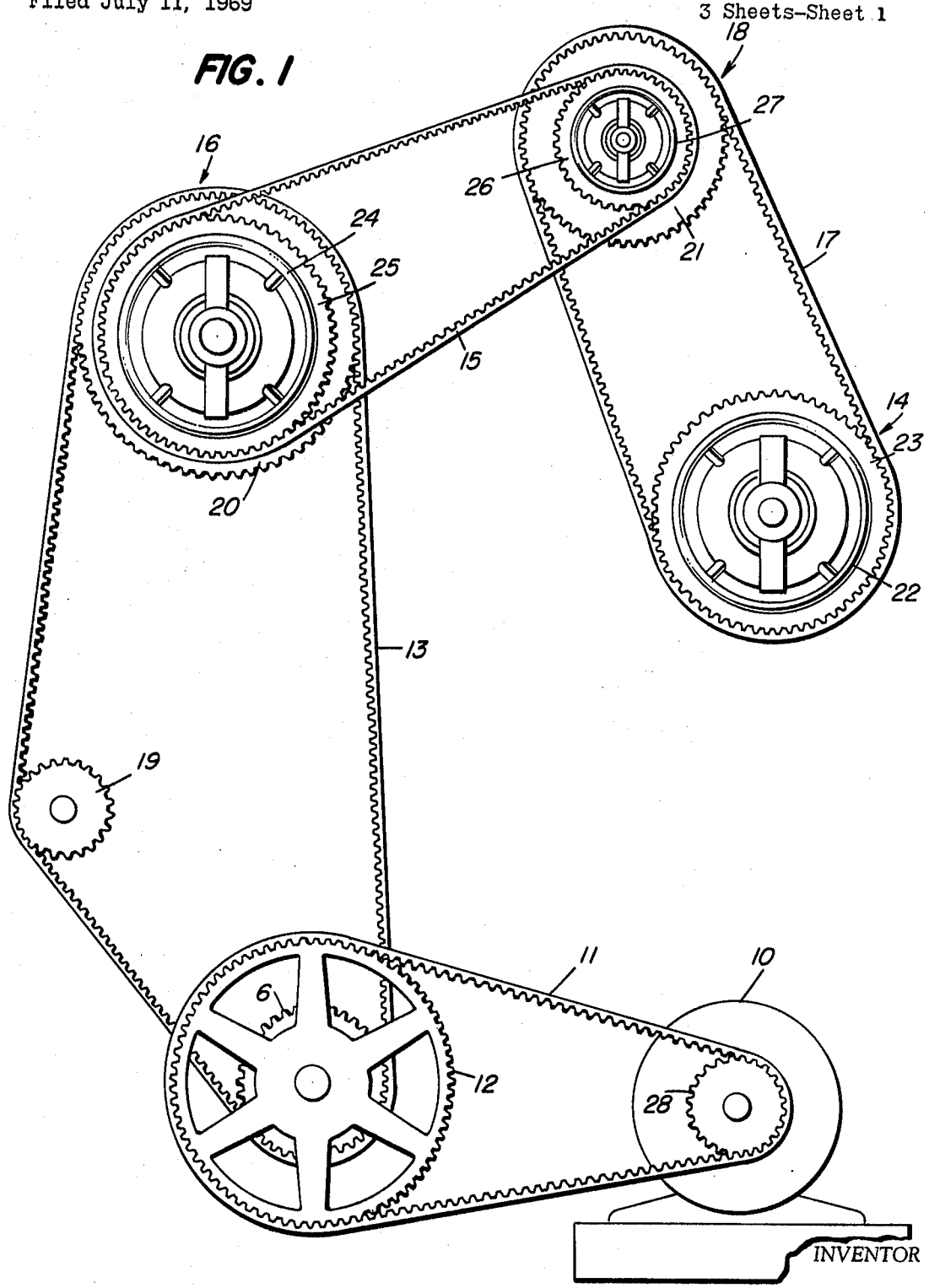
FIG. 1 shows in schematic form, a side view of the preferred arrangement for connecting the different elements of the invention together.

In general, the driving mechanism of FIG. 1 shows a driving motor 10 driving a jackshaft 12 via a timing belt 11. The jackshaft acts as the take-off point from which the common drive to the feed roll assembly 14 and the cutter drum assembly 16 is derived. Connected between the feed roll assembly 14 and the cutter drum assembly 16 is an idler pulley assembly 18 which is mounted on a movable block for taking up slack in the timing belts 15 and 17 when different timing gears having different numbers of teeth are installed to change the sheet length desired to be cut.

In particular, the illustrated driving mechanism of FIG. 1 shows the preferred arrangement for connecting the different elements of the invention to achieve the desired results. A driving motor 10 is shown as being connected to drive a jackshaft 12 through timing belt 11. The motor 10 includes a timing gear 28 mounted on the drive end thereof and the jackshaft 12 includes a toothed driving surface to cooperate with the timing belt 11 thereby insuring an accurate and trouble free mechanical connection. Jackshaft 12 has mounted on the inside thereof a timing gear 6 which acts as the common drive to the cutter drum assembly 16. Timing belt 13 cooperates with gear 6 and is shown as being directed around an idler pulley 19. Timing gear 20 on cutter drum assembly 16 has a fixed number of teeth and serves via belt 13 to drive the remainder of the elements.

It was found that if one could change the timing gear diameter at 25 on cutter drum 16, different sheet lengths could be cut and the change in slack of the timing belt 15 could be taken up by the idler pulley 18. Moreover, it was discovered that multiple changes in the timing gear 25 at cutter drum 16 in conjunction with changes in the timing gear 26 on idler pulley 18 allowed an even greater number of variations in possible sheet lengths to be cut. Finally, it became apparent that an even greater number of possible sheet lengths could be obtained by changing the timing gear 23 on feed roll assembly 14 in conjunction with changes in the other two assemblies.

Experiments were conducted with different timing gears in different places and it was found that within the limits of our present equipment 18,000 combinations could be achieved without impairing the operation of the machinery. For instance, with a fixed feed roll circumference of 36 inches, it was found that it was possible to use a timing gear with not more than 50 teeth on the feed roll assembly 14. Timing gears with a greater number of teeth proved to feed paper at too great a rate which exceeded the inspection capability of the paper inspection system. The lower limit turned out to be around 30 teeth since it was not feasible to sheet paper of a length greater than would be fed by a timing gear having fewer teeth.

Similarly, it was discovered that the timing gears 26 and 25 respectively of the idler assembly 18 and the cutter drum assembly 16 could not have a greater range than about 30 teeth. Hence the 18,000 combinations could be achieved theoretically by multiplying the differential of each timing gear.

It then became important to figure out a means for getting the timing gears off their respective assemblies when it became necessary to change the sheet length delivery. It was also necessary to devise a means for taking up the slack in the timing belts 15 and 17 when different timing gears having different numbers of teeth were installed. For these purposes, the pressure actuated pulley assembly and the idler pulley take-up assembly were developed.

Figure 2:
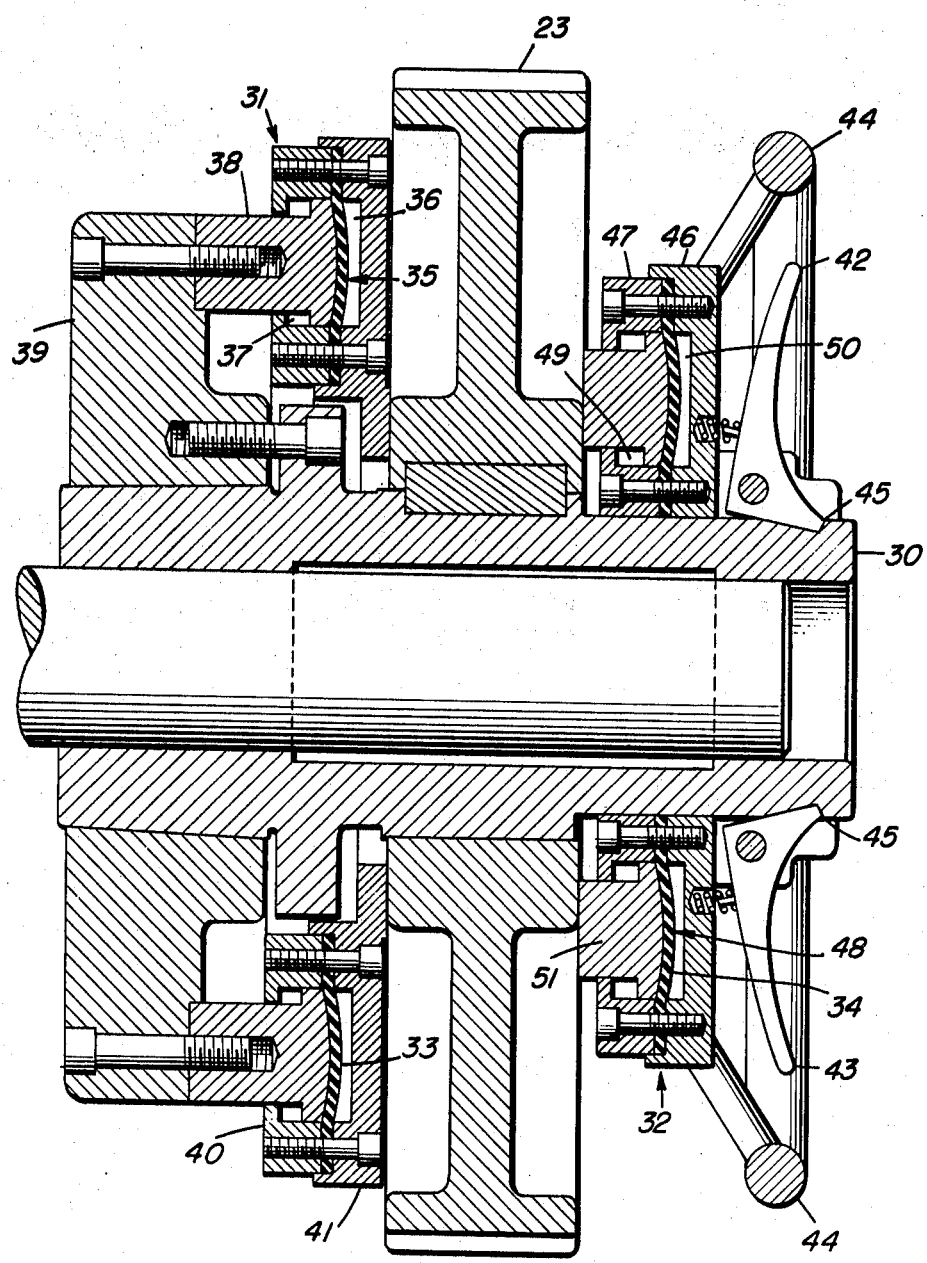
FIG. 2 illustrates a sectional view of one of the pressure actuated devices for assisting in removing and seating the exchangeable timing gears onto the shafts of the driven assemblies of the invention; and, FIG. 3 shows in schematic form, a side view of the variable ratio drive mechanism of the invention including the details for adjusting the position of the idler pulley assembly.

An example of the pressure actuated pulley assembly is shown in section in FIG. 2. Only one assembly is illustrated since each of the devices on the different drive shafts would be substantially the same. The timing gear 23 on the feed roll shaft has been chosen for the sake of convenience.

In general, the present device comprises a pair of retaining rings mounted on a shaft on opposite sides of the part to be secured. Each retaining ring carries an annular piston arranged to operate on the part to either urge it off the shaft or force it on the shaft. The piston is actuated either by air or hydraulic pressure supplied by conventional equipment in connection with maintenance of the machinery. The piston in one of the retaining rings is actuated to force the part into its final position on the shaft and the piston in the other retaining ring operates to move the retaining ring itself to force the part off the shaft. A mechanical catch means is provided to hold the part in its final position, although it has been found that constant pressure on the outer retaining ring piston is desirable as a safety factor in keeping the part in its final position.

Accordingly, timing gear 23 is mounted on shaft 30 between a pair of retaining rings 31, 32 each of which includes an expandable diaphragm 33, 34 of annular shape. Considering first the retaining ring 31, the diaphragm 33 divides an annular chamber 35 into two channels 36 and 37. The chamber 35 has reciprocally disposed therein an annular piston member 38 which is fixedly attached to a backing member 39. The member 39 is in turn keyed and fixed to the common shaft 30 so as to give a fixed base from which the piston member 38 can operate. Retaining ring 31 includes two elements 40 and 41 which are bolted or otherwise fixed to one another after the diaphragm 33 and annular piston 38 is inserted in the annular chamber 35.

The front portion 41 of retaining ring 31 abuts against the timing gear 23 and the rear portion 40 of retaining ring 31 simply surrounds the annular piston element 38. When it is desired to remove the timing gear 23, so as to put on a different gear having a lesser or greater number of teeth, it is only necessary to add fluid to the channel 36 (through an opening not shown) thereby moving the retaining ring to the right in relation to the fixed piston 38. Channel 37 in this case is always open to the atmosphere and does not offer any resistance to the movement of piston 38 in chamber 35.

However, before the timing gear 23 can be removed it is necessary to remove the outer retaining ring 32 from shaft 30 and this is accomplished by initially releasing the catch elements 42, 43 and pulling on the peripheral handle 44. Each of the catch elements are illustrated as being spring biased arms which have their respective lower ends engaged in slots 45 to keep the retaining ring 32 in position. Other types of catch elements could be used in lieu of the arms 42, 43 but for the sake of simplicity the illustrated embodiment has been used.

After the retaining ring 32 is removed from shaft 30, the pressure system set forth above can then be operated to urge the timing gear 23 off for replacement with another timing gear. Once the change is made, it is then necessary to bleed the channel 36 of retaining ring 31 preparatory to replacing retaining ring 32 and for forceably fixing the new timing gear in position.

For this latter purpose, the retaining ring 32 is used much in the same way that retaining ring 31 is used to remove the timing gear. Retaining ring 32 includes a two element annularly shaped device 46, 47 which are fixedly attached to one another to form the annular chamber 48. Annular chamber 48 is then divided into two channels 49, 50 by the diaphragm 34 and the piston element 51.

The outer portion 46 of retaining ring 32 has attached thereto the peripheral ring 44 and it is held firmly in position by the releasable catches 42, 43. The inner portion 47 of retaining ring 32 is attached to portion 46 and acts as a guide for the annular piston 51. The piston 51 has its rear face thereof in contact with the timing gear 23 so that it can force the timing gear into position and retain it in position. To accomplish this, channel 49 is bled while pressure is applied to channel 50 to move the piston against the timing gear 23 with the retaining ring remaining in position due to the catches 42, 43.

Thus, the mounting means is readily removed or added to the machinery while the dismounting means is self contained on the machinery and is readily available for quick and convenient use when needed without requiring any special tools or equipment. This arrangement would be particularly effective on a tapered shaft if such a system were desired since only a slight movement would be necessary to break the part loose from its final position.

Figure 3:
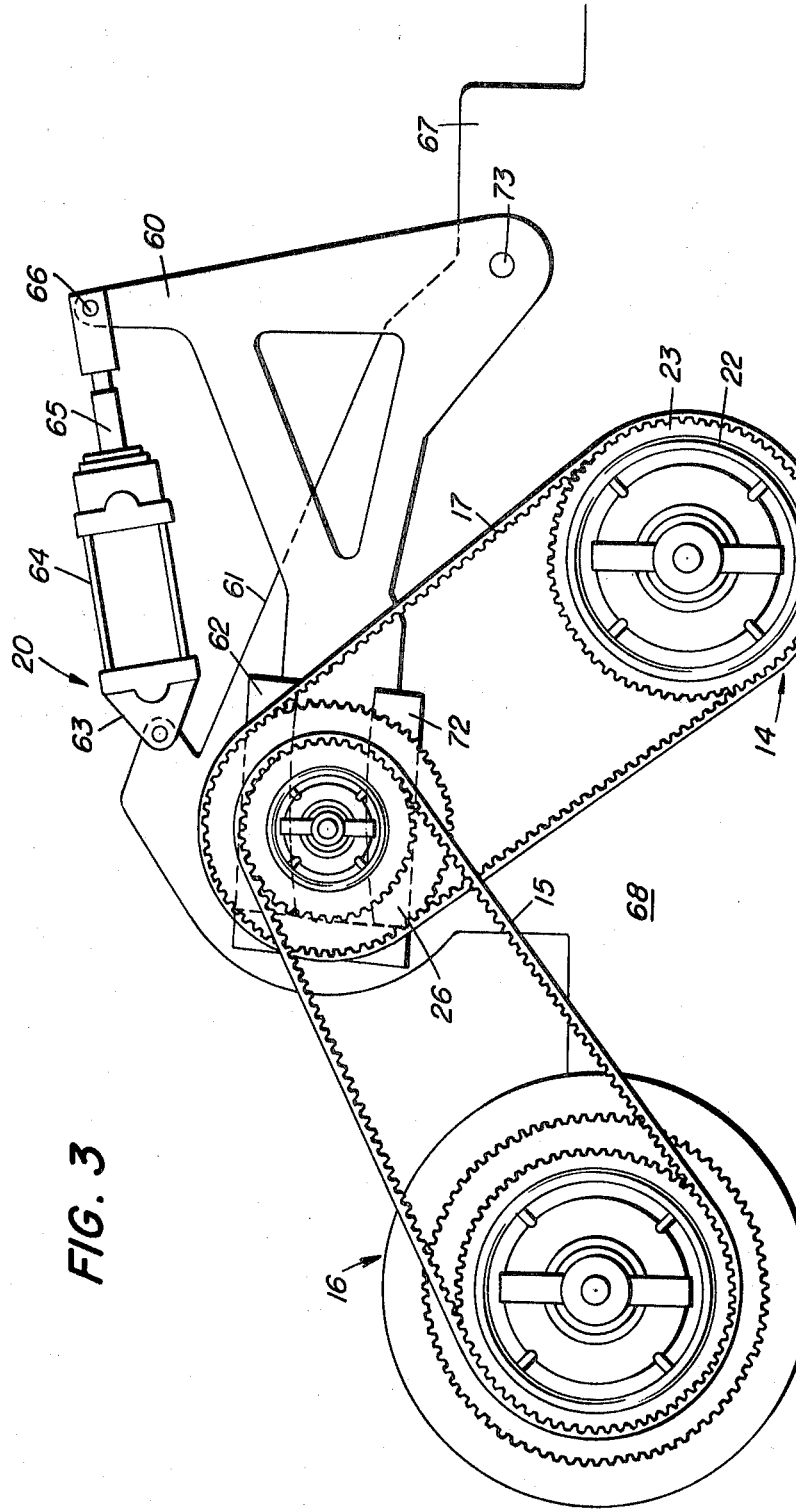

Finally, the means for providing an adjustable idler pulley assembly 18 was decided upon. It was deemed important to come up with an arrangement of parts which could be quickly and easily manipulated without special equipment. Accordingly, the system illustrated in FIG. 3 was derived.

This preferred embodiment employs a pair of arms 60 and 61 mounted on the machine frame structure at 67 in such a manner that the two arms might be moved relative to one another like a pair of scissors. For this purpose an air or hydraulic cylinder 64 is mounted between two extremities of the arms 60, 61 as shown so that when pressure is applied tot he cylinder the two parts will move in the manner hereinbefore set forth. The hydraulic cylinder 64 includes a connection 65, 66 to the arm 60 and a connection 63 to arm 61. The idler assembly shaft is mounted in a bearing support block (not shown) which moves on bearings between the bearing guides 62, 72 fixed to the arm 60. Arm 61 includes a cut-out slot (not shown) which permits movement of the idler assembly shaft along its arcuate path established by the curved bearing guides 62, 72 when it is desired to change timing gears and take up or provide slack in the timing belts 15, 17.

The operation of the adjustable idler pulley system is accomplished because of the fact that arm 61 is fixed to the machinery and arm 60 pivots about pivot point 73 upon actuation of the cylinder 64. Accordingly, when it is desired to remove the idler timing gear 26, cylinder 64 would be actuated to move arm 60 to the left thereby moving the idler assembly shaft to the left within the guide blocks 62, 72 to slacken up the belt system. The timing gear 26 would then be removed by utilizing the pneumatic pulley assembly mounted on the end of idler assembly 18 substantially as described with regard to the assembly shown in FIG. 2. That is, initially, the pressure would be releived from the channel 50 of outer retaining ring 32. This would allow the operator to press locking arms 42, 43 against their spring bias to remove the ends thereof from detents 45 and, the outer retaining ring 32 could then be removed by grasping the peripheral bar 44 and gently pulling it off.

Subsequently, the timing gear 26 would then be urged off the idler assembly shaft by using the inner retaining ring 31. The pressure in channel 37 of retaining ring 31 would be relieved while applying pressure to the channel 36. This step would urge the portion 41 of retaining ring 31 against the timing gear 26, since piston 38 remains fixed to element 39, thereby moving the timing gear 26 out and off the idler assembly shaft.

The operator would then select a different timing gear with fewer or more teeth than the first timing gear in accordance with a predetermined calculation to obtain the different sheet length setting desired. These calculations have been made on a computer and a table or other instruction manual would be made available to the operator to insure that the correct timing gear was selected.

Upon fitting the new timing gear 26 to the idler assembly shaft, the operator would have to relieve the pressure in channel 36 to permit movement of the inner retaining ring 31 away from the seated position for the new timing gear. Next the outer retaining ring 32 would be placed on the idler assembly shaft and the locking fingers 42, 43 would be engaged in position with the ends in detents 45 on the outer end of the shaft. Finally, pressure would be applied to the channel 50 of retaining ring 32 while bleeding pressure from channel 49 to allow annular piston 51 to force the timing gear into position.

The machine would then be put back into operation by once again applying pressure to the cylinder 64 to shift arm 60 and take up the slack in the timing belts 15, 17.

From the foregoing specification, it will readily be realized that the present invention makes possible a radical departure from the conventional method of accurately feeling and cutting a precise sheet length of paper prior to shipping. The product achieved by using the invention is ready for shipment without the additional processing generally required by conventional methods.

While certain preferred embodiments of the invention have been illustrated and described in detail, it is to be understood that many variations and modifications could be made by one versed in the art all within the scope of the invention. Furthermore, while the description has referred principally to a paper sheeting operation, sheets of other materials could be handled by the invention in like manner.

Finally, the invention is not deemed to be strictly limited to a sheeting operation. It should be obvious that the apparatus herein disclosed could just as readily be used on other types of machinery where a quickly interchangeable precise drive was required.

With these features in mind, and having now described the invention and the manner in which it might be used, the following claims define what is new and what is to be protected by Letters Patent.

I claim:

1. An adjustable ratio drive mechanism for feeding and cutting a web of material into sheets of different stock lengths comprising:
   (1) a first feed roll assembly having an exchangeable drive means removably attached to the driven end thereof;
   (2) a second cutter drum assembly having both a fixed drive means connected to a common drive element, and an exchangeable drive means removably attached to the driven end thereof;
   (3) a third idler roll assembly located intermediate said first two assemblies and having an exchangeable drive means removably attached to the driven end thereof;
   (4) fixed length timing belts connecting said first, second and third assemblies together with said exchangeable drive means comprising timing gears having different numbers of teeth; and,
   (5) a fluid pressure actuated device associated with the driven end of each of said first, second and third assemblies for assisting the selective removal and seating of at least one of said timing gears to achieve the drive ratio desired.

2. The drive mechanism of claim 1 wherein each of said fluid pressure actuated devices further comprise a pair of retaining rings one mounted on each side of each exchangeable timing gear.

3. The drive mechanism of claim 2 wherein each retaining ring includes an annular chamber located in the body thereof, with an annular piston mounted therein to form a pressure operated jack wherein the piston element of one retaining ring is actuated to urge the associated timing gear off the drive shaft and the piston element of said other retaining ring is actuated to force it onto the shaft.

4. The drive mechanism of claim 3 wherein each retaining ring includes two portions which together form the said annular chamber, and the said piston element includes a diaphragm which divides the annular chamber into two channels so that pressure applied to one channel acts on the said diaphragm to cause the said piston to operate on the timing gear to force it onto the shaft while pressure applied to an opposite channel of the other retaining ring serves to urge the timing gear off the shaft.

5. The drive mechanism of claim 4 wherein said idler roll assembly is mounted on a pair of arms connected to one another by a pressure actuated device, for changing the tension in said first and second timing belts when it is desired to exchange one or more of said exchangeable drive means to alter the ratio of said drive mechanism.

6. The drive mechanism of claim 5 wherein said arms include one arm fixed to the machinery and a second arm pivotally mounted on the machinery.

7. The drive mechanism of claim 6 wherein said idler roll assembly is mounted on a bearing block which moves within bearing guides on the said second arm to adjust the tension in said connecting means.

8. An adjustable ratio drive mechanism capable of providing a wide range of ratios in small positive increments comprising:
   (1) a plurality of driven assemblies;
   (2) at least one of said driven assemblies having exchangeable drive means removably attached to the driven end thereof;
   (3) one of said driven assemblies including a fixed drive means on the driven end thereof and an exchangeable drive means removably attached to the driven end thereof;
   (4) fixed length timing belts connecting said driven assemblies;
   (5) means associated with the driven end of each of said driven assemblies for assisting the selective removal and seating of at least one of said exchangeable driven means for changing the drive ratio of said mechanism.

9. The drive mechanism of claim 8 wherein said exchangeable drive means comprise timing gears having different numbers of teeth.

10. The drive mechanism of claim 9 wherein the means associated with the driven end of each driven assembly further comprises a fluid pressure actuated device having a pair of retaining rings, one mounted on each side of each exchangeable timing gear.

11. The drive mechanism of claim 10 wherein each retaining ring includes two portions which together form an annular chamber in the body thereof, and an annular piston element which includes a diaphragm located in said annular chamber and dividing the chamber into two channels so that pressure applied to one channel acts on the diaphragm to cause said piston to operate on the timing gear to force it onto the driven assembly while pressure applied to an opposite channel of the other retaining ring serves to urge the timing gear off the driven assembly.

References Cited
UNITED STATES PATENTS
3,217,552 11/1965 Daub _____ 74—219

MILTON KAUFMAN, Primary Examiner